(12) United States Patent
Seto

(10) Patent No.: US 7,502,865 B2
(45) Date of Patent: Mar. 10, 2009

(54) ADDRESSES ASSIGNMENT FOR ADAPTOR INTERFACES

(75) Inventor: Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 10/742,302

(22) Filed: Dec. 18, 2003

(65) Prior Publication Data

US 2005/0138202 A1    Jun. 23, 2005

(51) Int. Cl.
*G06F 15/173* (2006.01)
(52) U.S. Cl. .................. 709/238; 709/245; 709/250
(58) Field of Classification Search .............. 709/238, 709/245, 250
See application file for complete search history.

(56) References Cited

U.S. PATENT DOCUMENTS

| | | | |
|---|---|---|---|
| 5,706,440 A | | 1/1998 | Compliment et al. |
| 6,038,400 A | | 3/2000 | Bell et al. |
| 6,061,349 A | * | 5/2000 | Coile et al. .............. 370/389 |
| 6,351,375 B1 | | 2/2002 | Hsieh et al. |
| 6,553,005 B1 | * | 4/2003 | Skirmont et al. .......... 370/285 |
| 6,928,478 B1 | * | 8/2005 | Gangadharan ............. 709/226 |
| 2003/0076788 A1 | | 4/2003 | Grabauskas et al. |
| 2003/0210688 A1 | * | 11/2003 | Basso et al. ............... 370/389 |
| 2004/0054866 A1 | * | 3/2004 | Blumenau et al. ......... 711/202 |
| 2005/0163123 A1 | * | 7/2005 | Gangadharan ............. 370/392 |
| 2006/0101130 A1 | * | 5/2006 | Adams et al. .............. 709/218 |

FOREIGN PATENT DOCUMENTS

| | | |
|---|---|---|
| EP | 1363429 | 11/2003 |
| GB | 2354137 | 3/2001 |

OTHER PUBLICATIONS

Fairchild, Steven. "Expander Configuration Details," T10 Technical Committee memorandum, document ID XP-002327110; Sep. 17, 2002, 45 pp.
PCT/US2005/002990 International Search Report and Written Opinion mailed May 17, 2005.
PCT/US2004/040418 International Search Report and Written Opinion mailed Apr. 29, 2005.
US2003/0184902 published Oct. 2, 2003; U.S. Appl. No. 10/246,849, filed Sep. 18, 2002.

(Continued)

*Primary Examiner*—Nathan J Flynn
*Assistant Examiner*—Mohamed Wasel
(74) *Attorney, Agent, or Firm*—Konrad Raynes & Victor LLP; David W. Victor

(57) ABSTRACT

Provided are a method, system, and article of manufacture for assigning addresses for adaptor interfaces. An initial configuration assigning multiple local interfaces to one initial local address is maintained. For each local interface, a remote address of a remote interface on at least one remote device to which the local interface connects is received. The initial local address is used to identify the local interfaces assigned to the initial local address in response to receiving a same remote address for each remote interface connected to the local interfaces assigned the initial local address.

38 Claims, 8 Drawing Sheets

OTHER PUBLICATIONS

PCT/US2004/040138 International Search Report & Written Opinion mailed Sep. 23, 2005.
ANSI INCITS 376-2003: Serial Attached SCSI (SAS).
American National Standards Institute, "Fiber Channel Arbitrated Loop (FC-AL-2)", *American National Standard for Information Technology*, 1999, pp. i-v & 1-16.
American National Standards Institute, "Fiber Channel- Framing and Signaling (FC-FS)", *American National Standard for Information Technology*, Revision 1.80, Apr. 9, 2003, pp. i-xlvi & 1-18.
Deyring, K-P., "Serial ATA: High Speed Serialized AT Attachment", Jan. 7, 2003, Revision 1.0a, pp. 1-22.
Elliot, R.C. (Ed.), "Information Technology- SCSI Enclosure Services-2 (SES-2)", *Project T10/1559-D*, Jul. 15, 2003, Revision 4, pp. i-xiv & 1-79.
Elliot, R.C. (Ed.), "Information Technology- Serial Attached SCSI (SAS)", *Project T10/1562-D*, Jul. 9, 2003, Revision 5, pp. i-xxxii & 1-432.
Elliot, R., "Serial Attached SCSI Architecture", Sep. 2003, pp. 1-46.
Fairchild, S., "Expander Configuration Details", *T10 Document 02-359*, Sep. 9, 2002, pp. 1-17.
Fairchild, S., "SAS Expander Initiator Based Configuration", Jul. 12, 2002, pp. 1-32.
IEEE Computer Society, "Part 3: Carrier Sense Multiple Access With Collision Detection (CSMA/CS) Access Method and Physical Layer Specification", *IEEE Standard for Information Technology 802.3*, 2002, pp. 1-32.
McLean, P.T. (Ed.), "Information Technology- AT Attachment with Packet Interface-6 (ATA/ATAPI-6)", *T13/1410D*, Feb. 26, 2002, Revision 3B, pp. 1-56.
PCI Special Interest Group, "PCI Local Bus Specification", Mar. 29, 2002, Revision 2.3, pp. i-xiv & 1-6.
Phillips Semiconductors, "The I-C Bus Specification", Jan. 200, Version 2.1, pp. 1-46.
QLogic Corporation, "Enclosure Management Controller for Serial ATA", *Gen424 Data Sheet*, 2001, pp.1-4.
U.S. Appl. No. 10/741,460, filed Dec. 18, 2003, entitled "Multiple Interfaces in a Storage Enclosure", invented by P.L. Seto.
U.S. Appl. No. 10/742,029, filed Dec. 18, 2003, entitled "An Adaptor Supporting Different Protocols", Invented by P.L. Seto & D.N. Atallah.
U.S. Appl. No. 10/742,030, filed Dec. 18, 2003, entitled "Enclosure Management Device", invented by P.L. Seto.
U.S. Appl. No. 10/746,657, filed Dec. 23, 2003, entitled "Handling Redundant Paths Among Devices", invented by N.E. Marushak.
U.S. Appl. No. 10/787,074, filed Feb. 19, 2004, entitled "Generating Topology Information Identifying Devices in a Network Topology", invented by M.C. Clayton.
EP Office Action, May 11, 2007, for EP Application No. 04 812 611.4-2212, 6 pp.
First Office Action, Apr. 4, 2008, for CN 200480036848.4, 20 pp.
First Office Action, Apr. 4, 2008, for CN 200480036848.4, 19 pp. [translation].
International Preliminary Report on Patentability (IPER), Jun. 29, 2006, for PCT/US2004/040138, 9 pp.
Official Letter, Mar. 20, 2006, for ROC Application No. 93137188, 1 pp. [translation].
Second Office Action, May 5, 2008, for EP04812611.4-2212, 5 pp.
Second Office Action, Sep. 19, 2008, for CN200480036848.4, 8 pp.

* cited by examiner

ADDRESSES ASSIGNMENT FOR ADAPTOR INTERFACES

BACKGROUND

1. Field

The embodiments relate to addresses assignment for adaptor interfaces.

2. Description of the Related Art

An adaptor or multi-channel protocol controller enables a device coupled to the adaptor to communicate with one or more connected end devices over a physical cable or line according to a storage interconnect architecture, also known as a hardware interface, where a storage interconnect architecture defines a standard way to communicate and recognize such communications, such as Serial Attached Small Computer System Interface (SCSI) (SAS), Serial Advanced Technology Attachment (SATA), etc. These storage interconnect architectures allow a device to maintain one or more connections, such as direct point-to-point connections with end devices or connections extending through one or more expanders. Devices may also interconnect through a switch, an expander, a Fibre Channel arbitrated loop, fabric, etc. In the SAS/SATA architecture, a SAS port is comprised of one or more SAS PHYs, where each SAS PHY interfaces a physical layer, i.e., the physical interface or connection, and a SAS link layer having multiple protocol link layer. Communications from the SAS PHYs in a port is processed by the transport layers for that port. There is one transport layer for each SAS port to interface with each type of application layer supported by the port. A "PHY" as defined in the SAS protocol is a device object that is used to interface to other devices and a physical interface. Further details on the SAS architecture for devices and expanders is described in the technology specification "Information Technology—Serial Attached SCSI (SAS)", reference no. ISO/IEC 14776-150: 200x and ANSI INCITS.***:200x PHY layer (Jul. 9, 2003), published by ANSI; details on the Fibre Channel architecture are described in the technology specification "Fibre Channel Framing and Signaling Interface", document no. ISO/IEC AWI 14165-25; details on the SATA architecture are described in the technology specification "Serial ATA: High Speed Serialized AT Attachment" Rev. 1.0A (January 2003).

Within an adaptor, the PHY layer may include the parallel-to-serial converter to perform the serial to parallel conversion of data, so that parallel data is transmitted to layers above the PHY layer, and serial data is transmitted from the PHY layer through the physical interface to the PHY layer of a receiving device. In the SAS specification, there is one set of link layers for each SAS PHY layer, so that effectively each link layer protocol engine is coupled to a parallel-to-serial converter in the PHY layer. The physical interfaces for PHYs on different devices may connect through a cable or through a path etched on the circuit board to connect through a circuit board path.

As mentioned, a port contains one or more PHYs. Ports in a device are associated with physical PHYs based on the configuration that occurs during an identification sequence. A port is assigned one or more PHYs within a device for those PHYs within that device that are configured to use the same SAS address within a SAS domain during the identification sequence, where PHYs on a device having the same SAS address in one port connects to PHYs on a remote device that also use the same SAS address within a SAS domain. A wide port has multiple interfaces, or PHYs and a narrow port has only one PHY. A wide link comprises the set of physical links that connect the PHYs of a wide port to the corresponding PHYs in the corresponding remote wide port and a narrow link is the physical link that attaches a narrow port to a corresponding remote narrow port. Further details on the SAS architecture is described in the technology specification "Information Technology—Serial Attached SCSI (SAS)", reference no. ISO/IEC 14776-150:200x and ANSI INCITS.***:200x PHY layer (Jul. 9, 2003), published by ANSI.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
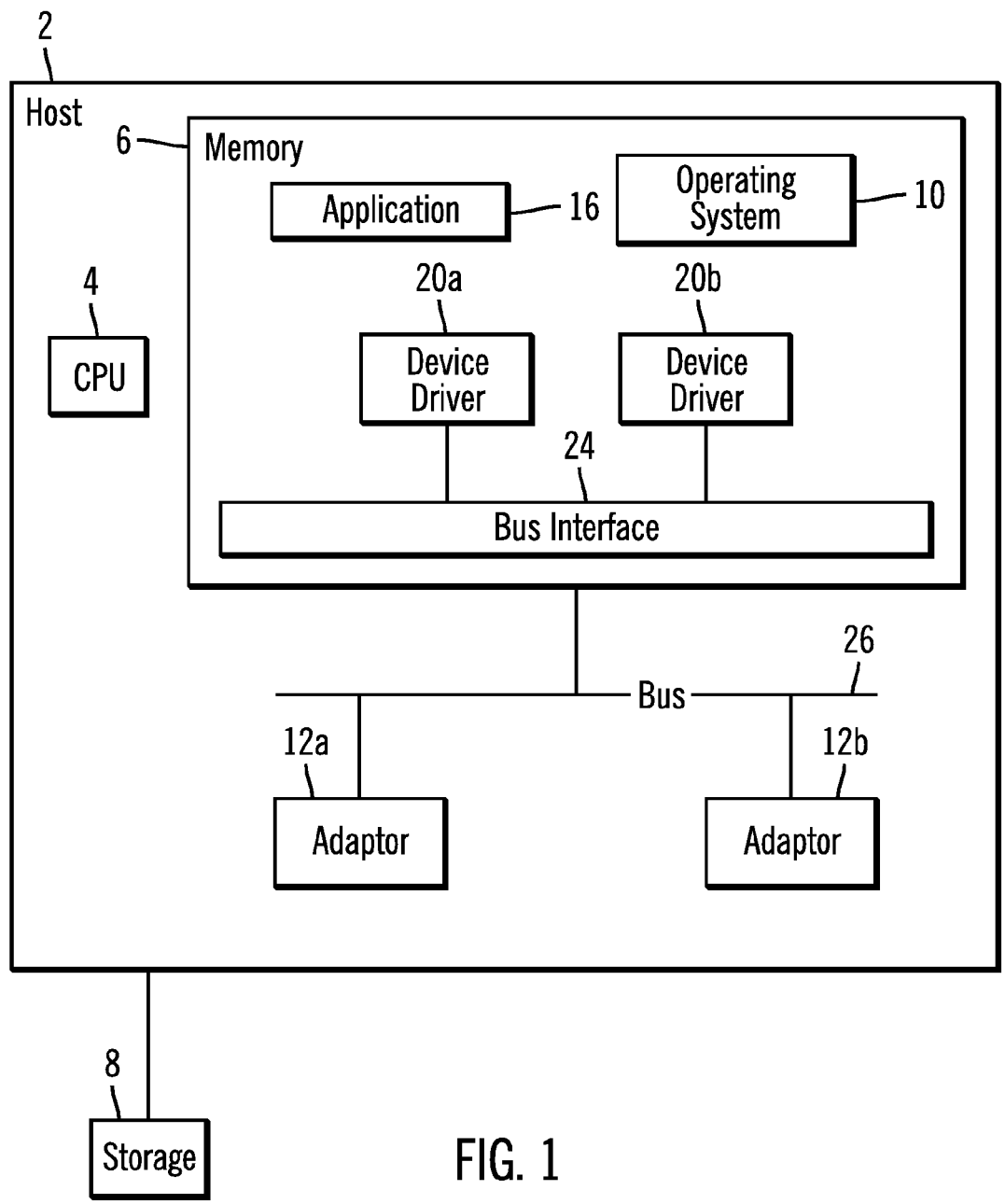
FIGS. 1 and 2 illustrate a system and adaptor in accordance with embodiments.

FIG. 1 illustrates a computing environment in which embodiments may be implemented. A host system 2 includes one or more central processing units (CPU) 4 (only one is shown), a volatile memory 6, non-volatile storage 8, an operating system 10, and adaptors 12a, 12b which includes physical interfaces to connect with remote deices, comprising end devices, switches, expanders, storage devices, servers, etc. An application program 16 further executes in memory 6 and is capable of transmitting and receiving transmissions via one of the adaptors 12a, 12b. The host 2 may comprise any computing device known in the art, such as a mainframe, server, personal computer, workstation, laptop, handheld computer, telephony device, network appliance, virtualization device, storage controller, etc. Various CPUs 4 and operating system 10 known in the art may be used. Programs and data in memory 6 may be swapped into storage 8 as part of memory management operations.

The operating system 10 may load a device driver 20a and 20b for each storage interface supported in the adaptor 12 to enable communication with a device communicating using the same supported storage interface and also load a bus interface 24, such as a Peripheral Component Interconnect (PCI) interface, to enable communication with a bus 26. Further details of PCI interface are described in the publication "PCI Local Bus, Rev. 2.3", published by the PCI-SIG. The operating system 10 may load device drivers 20a and 20b supported by the adaptors 12a, 12b upon detecting the presence of the adaptors 12a, 12b, which may occur during initialization or dynamically. In the embodiment of FIG. 1, the operating system 10 loads three device drivers 20a and 20b. For instance, the device drivers 20a and 20b may support the SAS and SATA storage interfaces, i.e., interconnect architectures. Additional or fewer device drivers may be loaded based on the number of storage interfaces the adaptors 12a and 12b supports.

Figure 2:
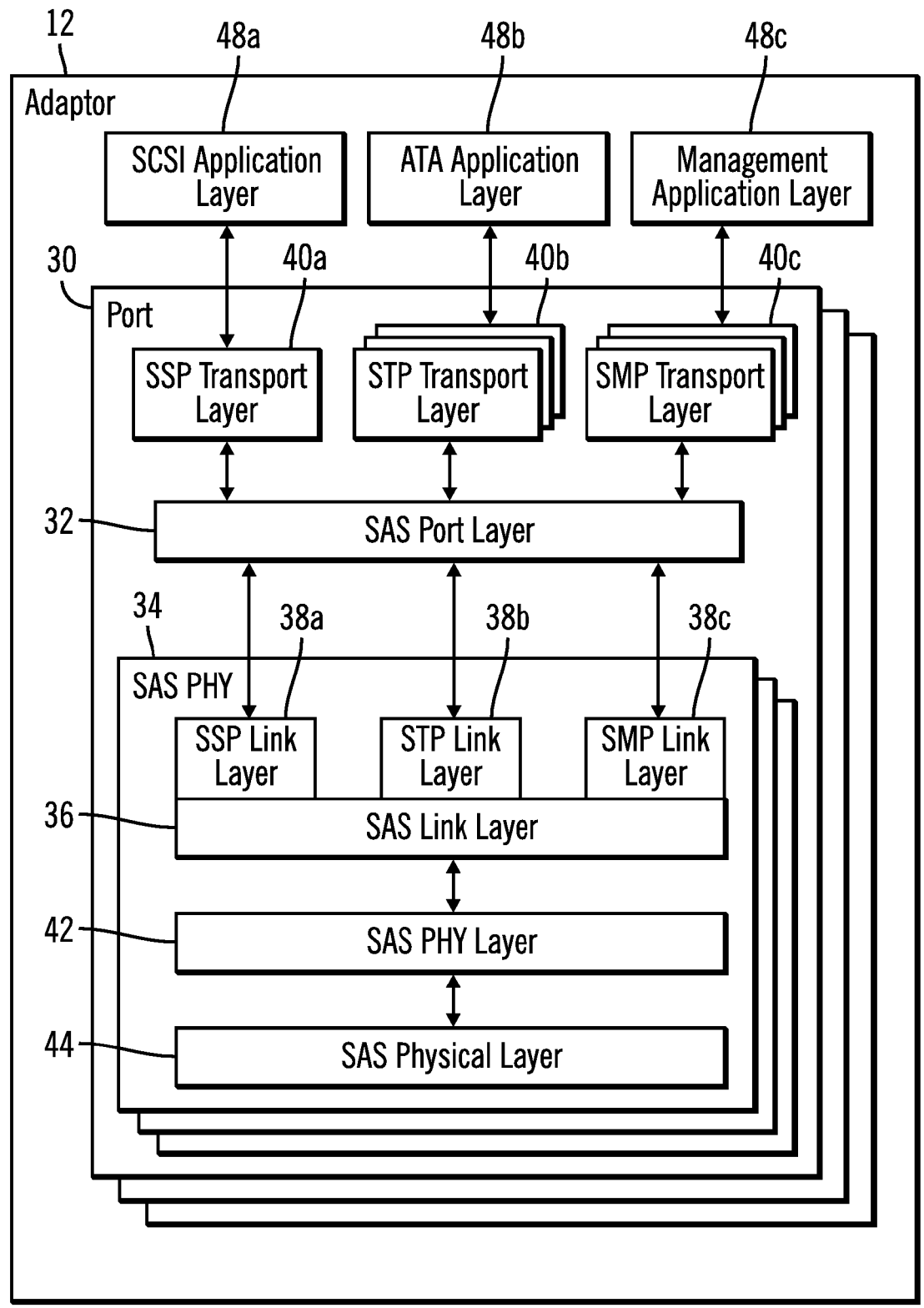

FIG. 2 illustrates an embodiment of an adaptor 12, which may comprise the adaptors 12a, 12b. Each adaptor includes one or more ports 30, where each port 30 contains a port layer 32 that interfaces with one or more SAS PHYs 34. Each PHY includes a SAS link layer 36 having one or more protocol link layers. FIG. 2 shows three protocol link layers, including a Serial SCSI Protocol (SSP) link layer 38a to process SSP frames, a Serial Tunneling Protocol. (STP) layer 38b, a Serial Management Protocol (SMP) layer 38c, which in turn interface through port layer 32 with their respective transport layers, a SSP transport layer 40a, a STP transport layer 40b, and an SMP transport layer 40c. The layers may be implemented as program components executed from memory and/or implemented in hardware.

Each PHY 34 for port 30 further includes a SAS PHY layer 42 and a physical layer 44. The physical layer 44 comprises the physical interface, including the transmitter and receiver circuitry, paths, and connectors. As shown, the physical layer 44 is coupled to the PHY layer 42, where the PHY layer 42 provides for an encoding scheme, such as 8b10b to translate bits, and a clocking mechanism. The PHY layer 32a, 32b . . . 32n may include a serial-to-parallel converter to perform the serial-to-parallel conversion and a phased lock loop (PLL) to track the incoming data and provide the data clock of the incoming data to the serial-to-parallel converter to use when performing the conversion. Data is received at the adaptor 12 in a serial format, and is converted at the SAS PHY layer 32a, 32b . . . 32n to the parallel format for transmission within the adaptor 12. The SAS PHY layer 42 further provides for error detection, bit shift and amplitude reduction, and the out-of-band (OOB) signaling to establish an operational link with another SAS PHY in another device, speed negotiation with the PHY in the external device transmitting data to adaptor 12, etc.

In the embodiment of FIG. 2, there is one protocol transport layer 40a, 40b, and 40c to interface with each type of application layer 48a, 48b, 48c in the application layer 50. The application layer 50 may be supported in the adaptor 12 or host system 2 and provides network services to the end users. For instance, the SSP transport layer 46a interfaces with a SCSI application layer 48a, the STP transport layer 46c interfaces with an Advanced Technology Attachment (ATA) application layer 48b, and the SMP transport layer 46d interfaces with a management application layer 48c. Further details on the operations of the physical layer, PHY layer, link layer, port layer, transport layer, and application layer and components implementing such layers described herein are found in the technology specification "Information Technology—Serial Attached SCSI (SAS)". Further details of the ATA technology are described in the publication "Information Technology-AT Attachment with Packet Interface-6 (ATA/ATAPI-6)", reference no. ANSI INCITS 361-2002 (September, 2002).

Each port 30 has a unique SAS address across adaptors 12 and each PHY 34 within the port has a unique identifier within the adaptor 12 for management functions and routing. An adaptor 12 may further have one or more unique domain addresses, where different ports in an adaptor 12 can be organized into different domains or devices. The SAS address of a PHY may comprise the SAS address of the port to which the PHY is assigned and that port SAS address is used to identify and address the PHY to external devices in a SAS domain.

Figure 3:
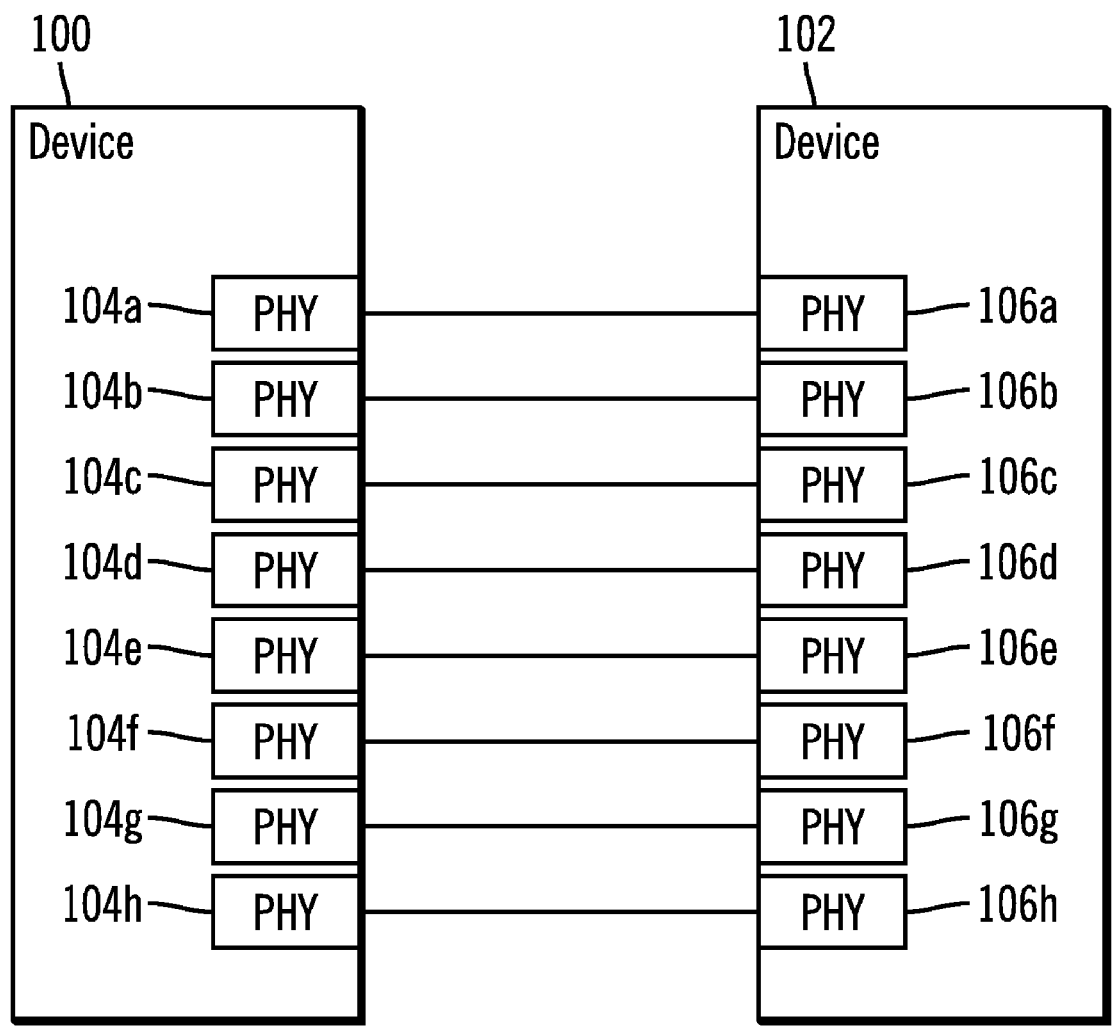
FIGS. 3, 5a, 5b, and 7 illustrate how devices may connect in accordance with embodiments.

FIG. 3 illustrates an example of how devices 100 and 102 may interface, where the device 100 has eight PHYs 104a, 104b . . . 104j linked to eight PHYs 106a, 106b . . . 106j, respectively, at the device 104. The devices 100 and 102 may comprise a host, expander, storage device, server, etc., where the devices may implement the architecture described with respect to FIG. 2 These devices 100 and 102 may have an initial address configuration for their PHYs, where the PHYs may share the same port address and be in the same domain. The initial address configuration for the PHYs in a device is based on user configuration selections.

Figure 4:
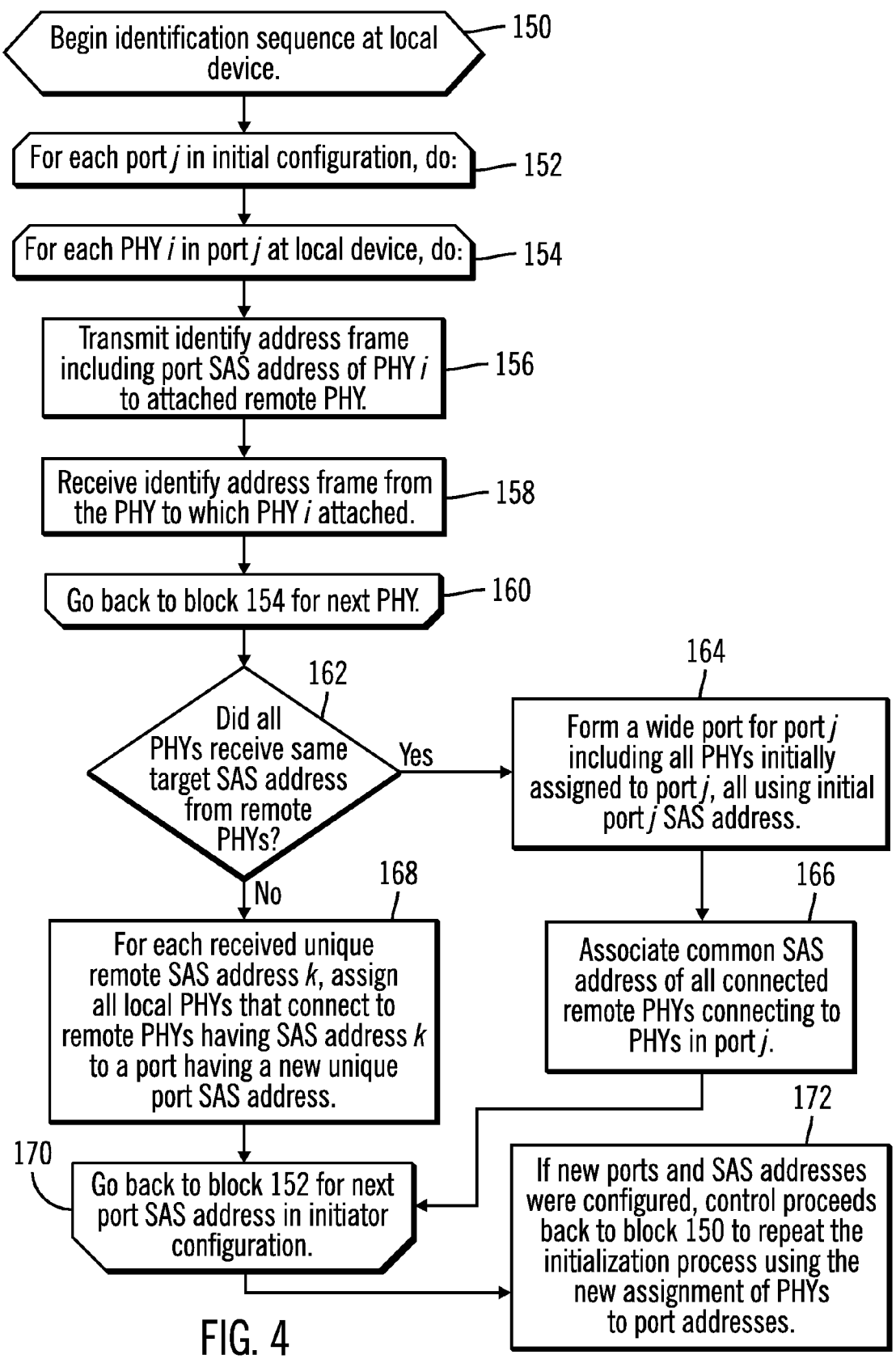
FIGS. 4 and 6 illustrate operations to perform an identification sequence between connected devices in accordance with embodiments.

FIG. 4 illustrates operations implemented in a device implementing the architecture of FIG. 2, such as adaptor 12 devices 100 and 102, to perform the identification sequence and configure the PHYs within ports. During the identification sequence, a device is informed of the address of remote interfaces, e.g., remote PHYs, connected to the local interfaces, e.g., local PHYs, of the device. The identification sequence operations in FIG. 4 may be programmed in the port layer 32 of the adaptor 12, devices 100, 102 or performed by a device driver 20a and 20b for the adaptor 12. Upon commencing (at block 150) the identification sequence after a reset or power-on sequence at a device, e.g., 100, a loop is performed at block 152 through 170 for each port j provided in the initial or default configuration maintained at the device, e.g., 100. For each initial port j a loop is performed at blocks 154 through 160 for each PHY i assigned to port j in the initial configuration. At block 156, a device, e.g., 100, transmits identify address information including the SAS address of PHY i, which is the SAS address of port j, to the attached PHY, e.g., 106a, 106b . . . 106h in remote device 102. The PHY i further receives (at block 158) the identify address information from the PHY to which PHY i is attached. Device 100 may receive the identification information from the remote device 102 before transmitting identification information, or vice versa. Identification for a PHY is complete when a PHY has transmitted and received identification information. Further, if the device 100 does not receive identification information for the attached device PHY, then a timeout may occur where the entire link initialization process is restarted. Control then proceeds back to block 154 to transmit and receive the identify address information for the next PHY.

After all the PHYs, e.g., 104a, 104b . . . 104h, have received the identify address information from the attached PHYs, e.g., 106a, 106b . . . 106h, a determination is made (at block 162) whether all the PHYs, e.g., 104a, 104b . . . 104h, received the same SAS address from the PHYs to which they connect. If so, then a wide port is formed for port j including all the PHYs, e.g., 104a, 104b . . . 104h, initially assigned to port j, so that all are configured to use the initial port j SAS address. The common SAS address of all the remote PHYs, e.g., 106a, 106b . . . 106h, is then associated with the common port j SAS address of the local PHYs, e.g., 104a, 104b . . . 104h, to use during operations. If (at block 162) the SAS addresses of the remote PHYs 106a, 106b . . . 106h are not the same, then for each received unique remote SAS address k, the local PHYs, e.g., 104a, 104b . . . 104h, that connect to remote SAS address k are assigned (at block 168) to a newly configured port having a new unique port SAS address. The new unique SAS addresses of the local PHYs may not be the same if the connected remote PHYs were in different remote devices. In certain embodiments, the new unique port SAS addresses may be different than the initial SAS address configured for the port or one port SAS address may be the same as the initial SAS address and the other additional new SAS addresses for the connections to different remote devices may be unique. From block 166 or 168, control proceeds (at block 170) back to block 152 to consider any further ports in the initial configuration. After considering all ports in the initial configuration, if (at block 172) new ports and SAS addresses were configured, control proceeds back to block 150 to perform a second instance of the initialization process using the new assignment of PHYs to port addresses.

The local and remote PHYs comprise local and remote interfaces at the local and remote devices, respectively. An interface is a physical or logical component that is connected to another interface on the same or a different device. The term interface may include interfaces other than PHY interfaces. A wide port comprises a port assigned multiple interfaces, where one or more interfaces may be assigned to a port. A local address, such as the local SAS address, comprises an address or identifier assigned to one or more interfaces and a remote address, such as the remote SAS address, comprises an address or identifier assigned to one or more interfaces in a remote device that connects to another interface, such as one of the local interfaces.

With the operations of FIG. 4, the ports are configured to include the maximum number of PHYs in each new port, where the PHYs in each new port will connect to PHYs in the connected adaptor that have the same SAS address. Further, if the PHYs in an initial port configuration are not connected to PHYs having the same PHY address, then new ports are configured with new SAS addresses to provide new ports, so that the PHYs assigned to the new ports connect to PHYs in the connected adaptors having the same SAS address. Further, after the reconfiguration of the ports, the identification sequence is performed again to perform configuration using the new port configuration.

Figure 5A:
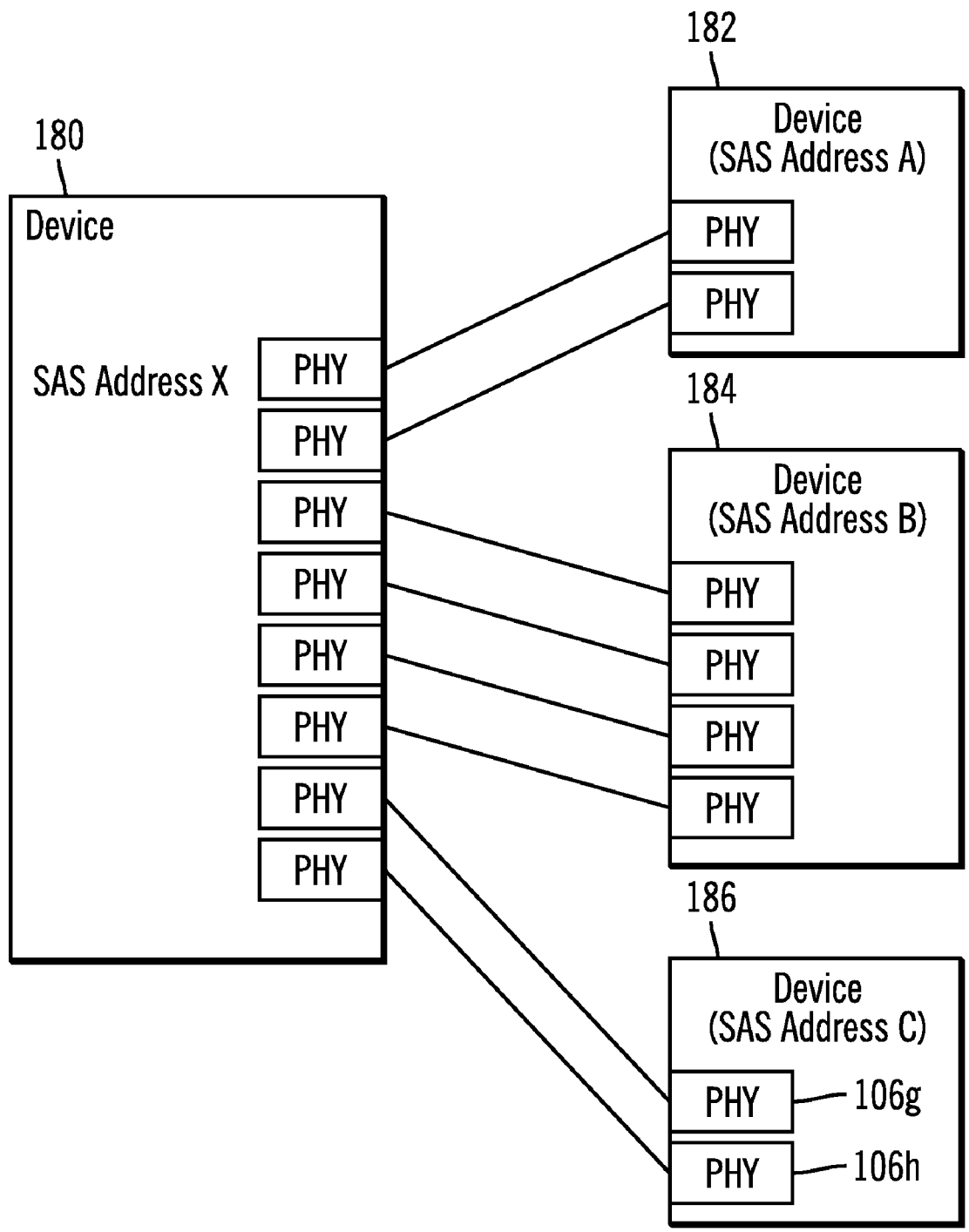
Figure 5B:
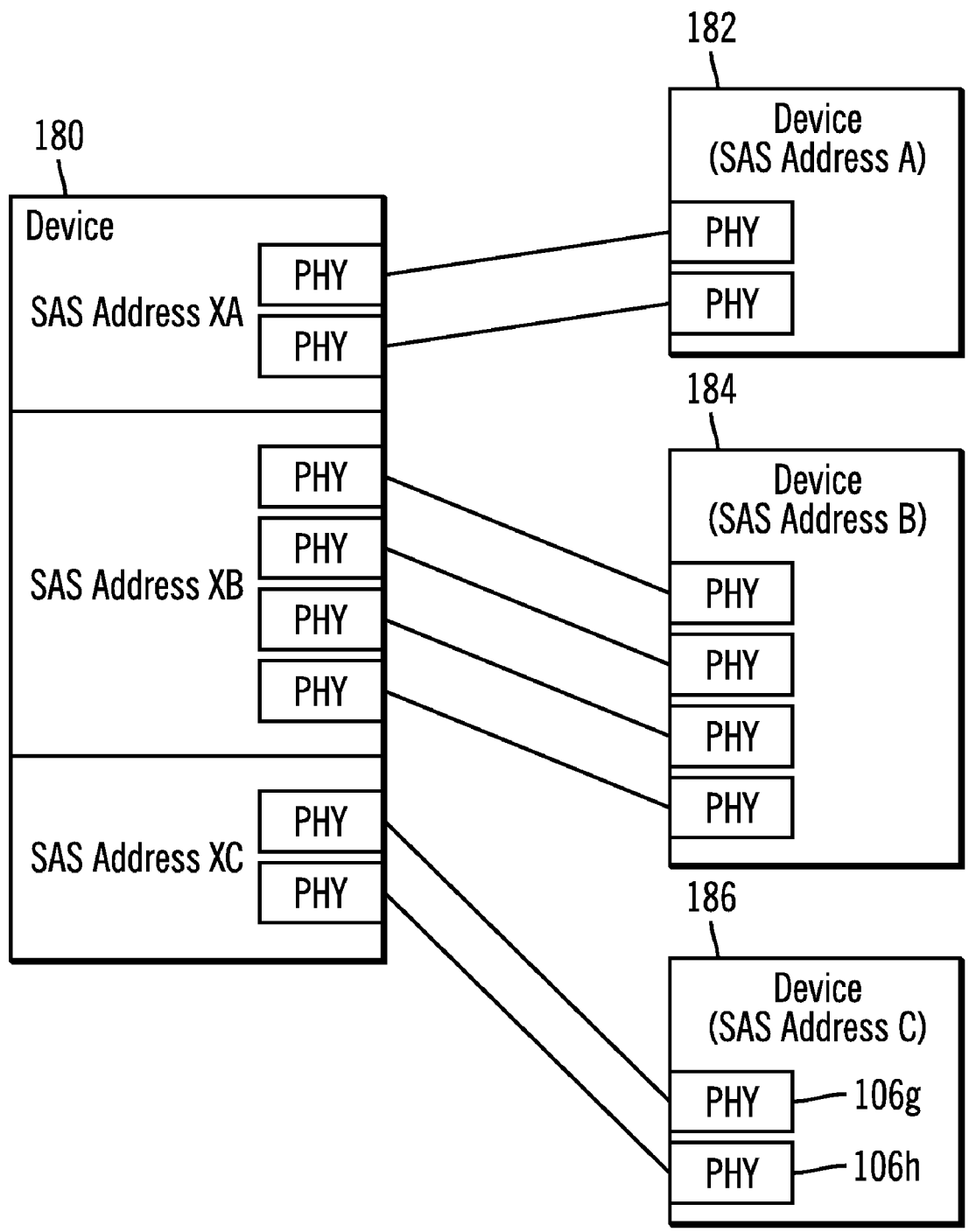

FIG. 5a illustrates an embodiment where the PHYs in the device 180 are configured to have one SAS address "x", which connect to PHYs in three different devices 182, 184, and 186, each having a different SAS address "A", "B", and "C". Performing the operations of FIG. 4 within a device having the configuration of FIG. 5a results in the configuration shown in FIG. 5b, in which adaptor 180 is configured to use three SAS addresses XA, XB, and XC to communicate with the PHYS in devices 182, 184, and 186. Each of the SAS addresses XA, XB, and XC may comprise the address of a different port.

Figure 6:
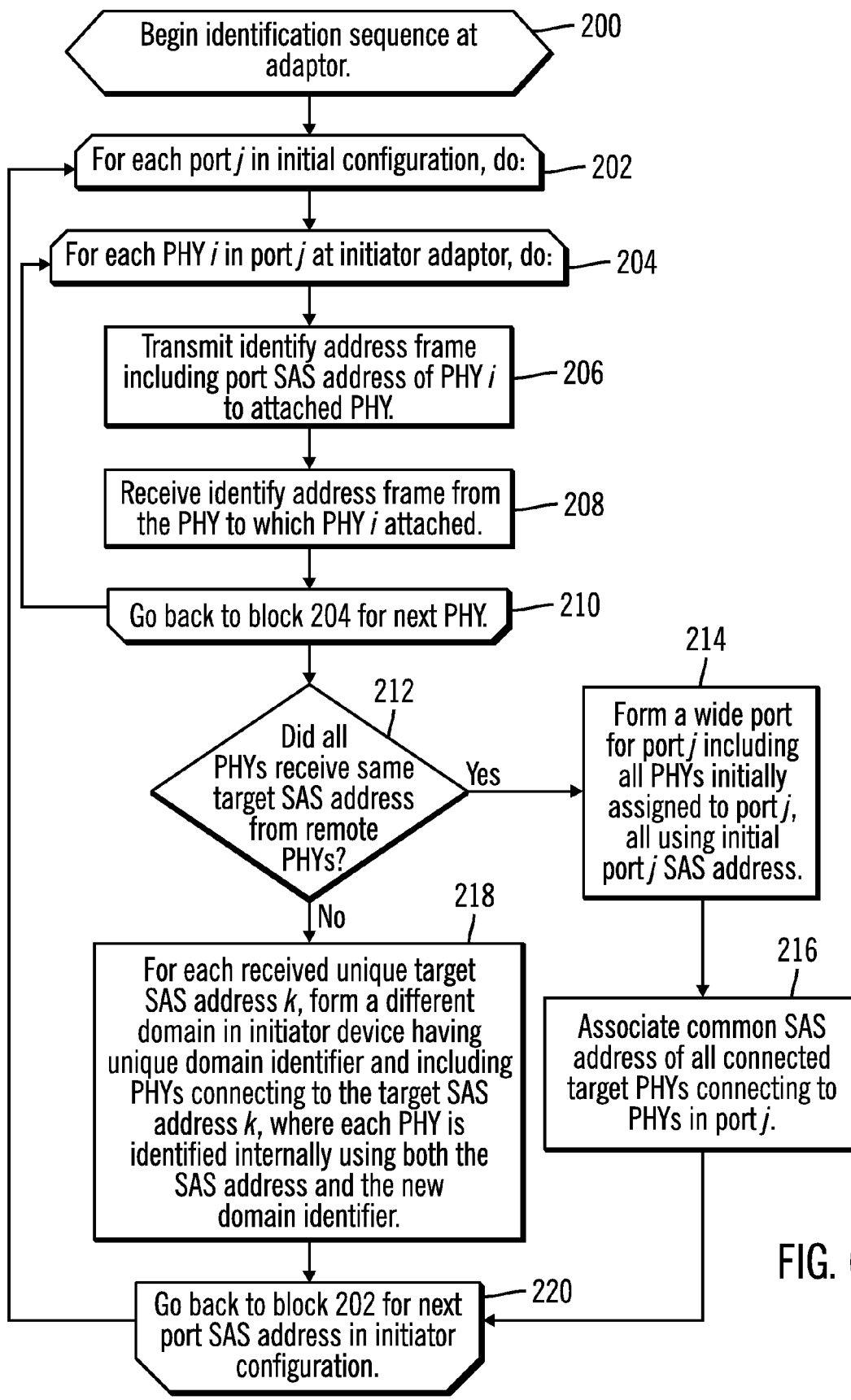

FIG. 6 illustrates an alternative embodiment of operations to perform the identification sequence and establish port configurations. FIG. 6 includes many of the same operations of FIG. 4, with the following exceptions. After determining (at block 212) that the connected PHYs do not return the same address for a port j, instead of configuring new ports with different SAS addresses as done in FIG. 4, at block 218, for each received unique target SAS address k, a different domain is formed in the device 180 having a unique domain identifier. Each PHY is then internally identified using both the SAS address and the newly configured domain identifier. After the domain designation is made, the device, e.g., 100 (FIG. 3), does not perform the identification sequence again and instead uses the domain identifier and SAS address to distinguish PHYs having the same address that are connected to different devices. However, external devices 182, 184, 186 may use the same SAS address to address the local PHYs.

Figure 7:
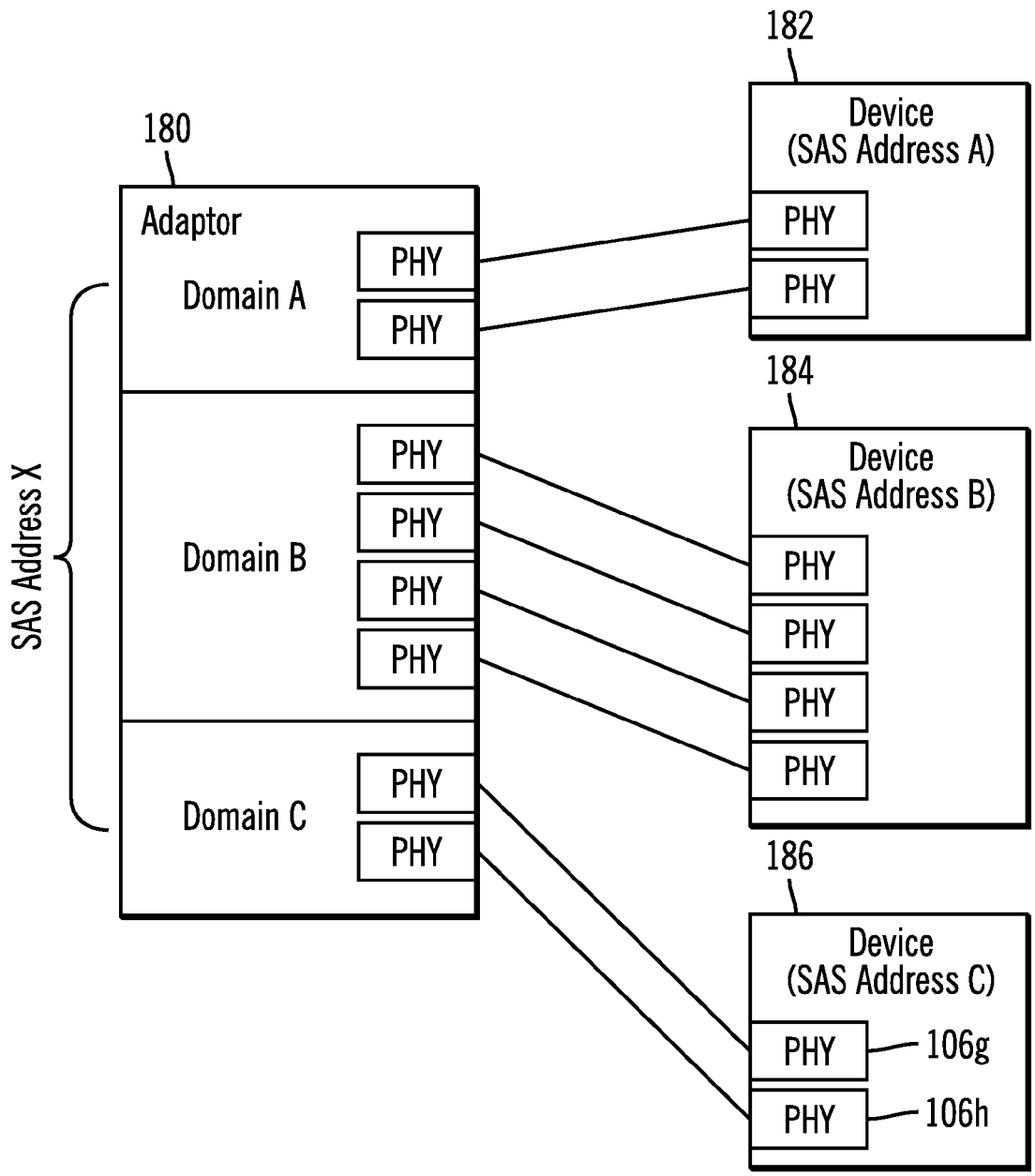

FIG. 7 illustrates an embodiment resulting from performing the operations of FIG. 6 in a device having the configuration shown in FIG. 5a, in which the device, e.g., 100, is configured to use the same SAS address "X" for PHYs connected to different devices 252, 254, and 256, but where those PHYs connected to different addresses are configured in different domains A, B, C. Thus, the device 250 uses the combination of domain identifier and SAS address to distinguish its local PHYs. With the embodiment of FIG. 6, a second identification sequence is not performed, unlike the second identification sequence performed at block 172 in FIG. 4, because there is no alteration of the default port configuration. Instead, the same address "X" is used. Thus, the remote devices 182, 184, 186 (FIG. 7) use the same SAS address to address the different PHYs in device 180 and the device 180 uses the domain addresses A, B, C in combination with the port SAS address "X" to distinguish the local PHYs. devices.

The described embodiments provide techniques for assigning PHYs or interfaces to ports when the interfaces receive different SAS addresses from the attached PHYs. The embodiment of FIG. 6 minimizes communication and coordination between the local and remote PHYs, because the initial address configuration is used for interfaces that receive different addresses from the attached device and the device internally distinguishes interfaces connected to different addresses by assigning the interfaces to different domains.

In certain embodiments, the configuration is performed to form ports having a maximum possible width, i.e., maximum number of PHYs/connections. Maximizing the number of PHYs in a port maximizes the throughput for a port. Further, maximizing PHYs maximizes the load balancing opportunities. Yet further, maximizing the number of PHYs and connections at a port increases the number of alternate paths to the port, which minimizes I/O latency. Still further, maximizing the number of PHYs at a port provides redundant connections to allow continued operations should one or more PHYs fail.

Additional Embodiment Details

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adaptors, etc., may be implemented in one or more integrated circuits on the adaptor or on the motherboard.

In the described embodiments, a physical interface was represented by a PHY, providing an interface between the physical connection and other layers within the adaptor. In additional embodiments, the interface representing a physical connection may be implemented using constructs other than a PHY.

Described embodiments utilize the SAS architecture. In alternative embodiments, the described techniques for assigning physical connections to ports may apply to additional storage interfaces.

In the described embodiments, certain operations were described with respect to layers within the device/adaptor architectures. In alternative implementations, the functions described as performed by a certain layer may be performed in a different layer.

In the described embodiments, transmissions are received at a device from a remote device over a connection. In alternative embodiments, the transmitted and received information processed by the transport protocol layer or device driver may be received from a separate process executing in the same computer in which the device driver and transport protocol driver execute.

In certain embodiments, the device driver and network adaptor embodiments may be included in a computer system including a storage controller, such as a SCSI, Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In described embodiments, the storage interfaces supported by the adaptors comprised SATA and SAS. In additional embodiments, other storage interfaces may be supported. Additionally, the adaptor was described as supporting certain transport protocols, e.g. SSP, STP, and SMP. In further implementations, the adaptor may support additional transport protocols used for transmissions with the supported storage interfaces. The supported storage interfaces may transmit data at the same link speeds or at different, non-overlapping link speeds. Further, the physical interfaces may have different physical configurations, i.e., the arrangement and number of pins and other physical interconnectors, when the different supported storage interconnect architectures use different physical configurations.

The illustrated operations of FIGS. 4 and 6 show certain events occurring in a certain order. In alternative embodiments, certain operations may be performed in a different order, modified or removed. Moreover, operations may be added to the above described operations and still conform to the described embodiments. Further, operations described herein may occur sequentially or certain operations may be processed in parallel. Yet further, operations may be performed by a single processing unit or by distributed processing units.

The adaptors 12a, 12b may be implemented in a network card, such as a Peripheral Component Interconnect (PCI) card or some other I/O card, or on integrated circuit components mounted on a system motherboard or backplane.

The foregoing description of various embodiments has been presented for the purposes of illustration and description. Many modifications and variations are possible in light of the above teaching.

What is claimed is:

1. A method, comprising:
    maintaining an initial configuration by assigning multiple local interfaces to one initial local port address of a port to which the local interfaces are assigned as part of the initial configuration;
    for each local interface, receiving a remote address of a remote interface on at least one remote device to which the local interface connects;
    using the initial local port address to identify the local interfaces assigned to the initial local port address in response to receiving a same remote address for each remote interface connected to the local interfaces assigned the initial local port address;
    generating at least one identifier in response to receiving multiple remote addresses from the remote interfaces connected to the local interfaces; and
    assigning different identifiers to the local interfaces previously assigned the initial local port address in response to generating the at least one identifier.

2. The method of claim 1, wherein each generated identifier comprises an additional port address, further comprising:
    configuring an additional port in the device for each generated additional port address; and
    assigning local interfaces to the ports, including the additional port and port having the initial local port address.

3. The method of claim 2, wherein the local interfaces assigned to one port connect to remote interfaces having a same remote address.

4. The method of claim 1, wherein the at least one received remote address is received as part of an identification sequence, further comprising:
    transmitting the initial local port address to the remote interfaces connected to the local interfaces.

5. The method of claim 4, wherein the identifiers assigned to the local interfaces, including the at least one generated identifier, comprise local port addresses, further comprising:
    initiating an additional identification sequence in response to generating the at least one local port address; and
    transmitting the local port addresses identifying the local interfaces to the connected remote interfaces in response to the additional identification sequence.

6. The method of claim 1, wherein the at least one remote device and a local device including the local interfaces implement the SAS architecture, wherein the local and remote addresses comprise SAS addresses, and wherein the local and remote interfaces comprise PHYs.

7. The method of claim 1, wherein the remote interfaces having different remote addresses are on different remote devices.

8. The method of claim 1, wherein generating the at least one identifier comprises generating a different identifier for each received different remote address, wherein a combination of the identifiers and the initial local port address are used to identify the local interfaces assigned.

9. The method of claim 8, wherein the plurality of identifiers comprise domains, wherein the local interfaces remain assigned to the port having the initial local port address.

10. The method of claim 8, wherein the remote interfaces having different remote addresses are on different remote devices, wherein the combination of each of the plurality of identifiers and the default local port address identify the local interfaces within a local device and wherein the initial local port address identifies the local interfaces within the remote devices.

11. The method of claim 8, wherein the plurality of identifiers comprise domains, further comprising:
    for each received remote address, generating a different domain in a local device including the local interfaces connected to the remote interfaces having the remote addresses.

12. The method of claim 11, wherein the generated domains include one domain in the initial configuration.

13. A device in communication with a plurality of remote interfaces on at least one remote device, comprising:
    a plurality of local interfaces;

an initial configuration assigning multiple local interfaces to one initial local port address of a port to which the local interfaces are assigned as part of the initial configuration;

circuitry capable of causing operations, the operations comprising:

for each local interface, receiving a remote address of one remote interface to which the local interface connects;

using the initial local port address to identify the local interfaces assigned to the initial local port address in response to receiving a same remote address for each remote interface connected to the local interfaces assigned the initial local port address;

generating at least one identifier in response to receiving multiple remote addresses from the remote interfaces connected to the local interfaces; and assigning different identifiers to the local interfaces previously assigned the initial local port address in response to generating the at least one identifier.

14. The device of claim 13, wherein each generated identifier comprises an additional port address, and wherein the operations further comprise:

configuring an additional port in the device for each generated additional port address; and assigning local interfaces to the ports, including the additional port and port having the initial local port address.

15. The device of claim 14, wherein the local interfaces assigned to one port connect to remote interfaces having a same remote address.

16. The device of claim 13, wherein the at least one received remote address is received as part of an identification sequence, wherein the operations further comprise:

transmitting the initial local port address to the remote interfaces connected to the local interfaces.

17. The device of claim 13, wherein the identifiers assigned to the local interfaces, including the at least one generated identifier, comprise local port addresses, wherein the operations further comprise:

initiating an additional identification sequence in response to generating the at least one local port address; and transmitting the local port addresses identifying the local interfaces to the connected remote interfaces in response to the additional identification sequence.

18. The device of claim 13, wherein the at least one remote device and the device implement the SAS architecture, wherein the local and remote addresses comprise SAS addresses, and wherein the local and remote interfaces comprise PHYs.

19. The device of claim 13, wherein the remote interfaces having different remote addresses are on different remote devices.

20. The device of claim 13, wherein generating the at least one identifier comprises generating a different identifier for each received different remote address, wherein a combination of the identifiers and the initial local port address are used to identify the local interfaces assigned.

21. The device of claim 20, wherein the plurality of identifiers comprise domains, wherein the local interfaces remain assigned to the port having the initial local port address.

22. The device of claim 20, wherein the remote interfaces having different remote addresses are on different remote devices, wherein the combination of each of the plurality of identifiers and the default local port address identify the local interfaces within the local device and wherein the initial local port address identifies the local interfaces within the remote devices.

23. The device of claim 20, wherein the plurality of identifiers comprise domains, wherein the operations further comprise:

for each received remote address, generating a different domain in the local device including the local interfaces connected to the remote interfaces having the remote addresses.

24. The device of claim 23, wherein the generated domains includes one domain in the initial configuration.

25. A system in communication with at least one remote device having a plurality of remote interfaces, comprising:

a circuit board;

an adaptor coupled to the circuit board, comprising:

a plurality of local interfaces;

an initial configuration assigning multiple local interfaces to one initial local port address of a port to which the local interfaces are assigned as part of the initial configuration;

circuitry capable of causing operations to be performed, the operations comprising:

for each local interface, receiving a remote address of one remote interface to which the local interface connects;

using the initial local port address to identify the local interfaces assigned to the initial local port address in response to receiving a same remote address for each remote interface connected to the local interfaces assigned the initial local port address;

generating at least one identifier in response to receiving multiple remote addresses from the remote interfaces connected to the local interfaces; and assigning different identifiers to the local interfaces previously assigned the initial local port address in response to generating the at least one identifier.

26. An article of manufacture comprising at least one of a hardware device having hardware logic and a computer readable storage medium having computer executable code for interfacing local interfaces in a local device with connected remote interfaces in at least one remote device, wherein the article of manufacture causes operations to be performed, the operations comprising:

maintaining an initial configuration assigning multiple local interfaces to one initial local port address of a port to which the local interfaces are assigned as part of the initial configuration;

for each local interface, receiving a remote address of one remote interface to which the local interface connects;

using the initial local port address to identify the local interfaces assigned to the initial local port address in response to receiving a same remote address for each remote interface connected to the local interfaces assigned the initial local port address;

generating at least one identifier in response to receiving multiple remote addresses from the remote interfaces connected to the local interfaces; and assigning different identifiers to the local interfaces previously assigned the initial local port address in response to generating the at least one identifier.

27. The article of manufacture of claim 26, wherein each generated identifier comprises an additional local port address, wherein the operations further comprise:

configuring an additional port in the device for each generated additional local port address; and assigning local interfaces to the ports, including the additional port and port having the initial local port address.

28. The article of manufacture of claim 26, wherein the local interfaces assigned to one port connect to remote interfaces having a same remote address.

29. The article of manufacture of claim 26, wherein the at least one received remote address is received as part of an identification sequence, wherein the operations further comprise:
transmitting the initial local port address to the remote interfaces connected to the local interfaces.

30. The article of manufacture of claim 29, wherein the identifiers assigned to the local interfaces, including the at least one generated identifier, comprise local port addresses, wherein the operations further comprise:
initiating an additional identification sequence in response to generating the at least one local port address; and
transmitting the local port addresses identifying the local interfaces to the connected remote interfaces in response to the additional identification sequence.

31. The article of manufacture of claim 26, wherein the at least one remote device and a local device including the local interfaces implement the SAS architecture, wherein the local and remote addresses comprise SAS addresses, and wherein the local and remote interfaces comprise PHYs.

32. The article of manufacture of claim 26, wherein the remote interfaces having different remote addresses are on different remote devices.

33. The article of manufacture of claim 26, wherein generating the at least one identifier comprises generating a different identifier for each received different remote address, wherein a combination of the identifiers and the initial local port address are used to identify the local interfaces assigned.

34. The article of manufacture of claim 33, wherein the plurality of identifiers comprise domains and wherein the local interfaces remain assigned to the port having the initial local port address.

35. The article of manufacture of claim 33, wherein the remote interfaces having different remote addresses are on different remote devices, wherein the combination of each of the plurality of identifiers and the default local port address identify the local interfaces within a local device and wherein the initial local port address identifies the local interfaces within the remote devices.

36. The article of manufacture of claim 33, wherein the plurality of identifiers comprise domains, wherein the operations further comprise:
for each received remote address, generating a different domain in a local device including the local interfaces connected to the remote interfaces having the remote addresses.

37. The article of manufacture of claim 36, wherein the generated domains include one domain in the initial configuration.

38. The article of manufacture of claim 26, wherein the article of manufacture stores instructions that when executed result in performance of the operations.

* * * * *